US008190337B2

United States Patent
McClure et al.

(10) Patent No.: US 8,190,337 B2
(45) Date of Patent: *May 29, 2012

(54) SATELLITE BASED VEHICLE GUIDANCE CONTROL IN STRAIGHT AND CONTOUR MODES

(75) Inventors: John A. McClure, Scottsdale, AZ (US);
Dennis M. Collins, Overgaard, AZ (US);
John T. E. Timm, Broomfield, CO (US)

(73) Assignee: Hemisphere GPS, LLC, Calgary, Alberta (CA)

( * ) Notice: Subject to any disclaimer, the term of this patent is extended or adjusted under 35 U.S.C. 154(b) by 701 days.

This patent is subject to a terminal disclaimer.

(21) Appl. No.: 12/251,279

(22) Filed: Oct. 14, 2008

(65) Prior Publication Data

US 2009/0099730 A1    Apr. 16, 2009

Related U.S. Application Data

(63) Continuation-in-part of application No. 10/804,721, filed on Mar. 19, 2004, now Pat. No. 7,437,230.

(60) Provisional application No. 60/456,130, filed on Mar. 20, 2003.

(51) Int. Cl.
*G06F 7/70*    (2006.01)
(52) U.S. Cl. ............. 701/50; 701/23; 701/221; 701/213
(58) Field of Classification Search .................... 701/41, 701/50, 200, 213, 214, 23, 221; 250/221, 250/559.29; 342/357.06, 357.12, 357.14
See application file for complete search history.

(56) References Cited

U.S. PATENT DOCUMENTS

| 3,585,537 | A | 6/1971 | Rennick et al. |
| 3,596,228 | A | 7/1971 | Reed, Jr. et al. |
| 3,727,710 | A | 4/1973 | Sanders et al. |
| 3,815,272 | A | 6/1974 | Marleau |
| 3,899,028 | A | 8/1975 | Morris et al. |
| 3,987,456 | A | 10/1976 | Gelin |
| 4,132,272 | A | 1/1979 | Holloway et al. |

(Continued)

FOREIGN PATENT DOCUMENTS

JP    07244150    9/1995

(Continued)

OTHER PUBLICATIONS

"International Search Report and Written Opinion", PCT/US2004/015678, filed May 17, 2004, mailed Jun. 21, 2005.

(Continued)

*Primary Examiner* — Christopher J. Novosad
(74) *Attorney, Agent, or Firm* — Law Office of Mark Brown, LLC; Mark E. Brown

(57) ABSTRACT

A method for steering an agricultural vehicle comprising: receiving global positioning system (GPS) data including position and velocity information corresponding to at least one of a position, velocity, and course of the vehicle; receiving a yaw rate signal; and computing a compensated heading, the compensated heading comprising a blend of the yaw rate signal with heading information based on the GPS data. For each desired swath comprising a plurality of desired positions and desired headings, the method also comprises: computing an actual track and a cross track error from the desired swath based on the compensated heading and the position; calculating a desired radius of curvature to arrive at the desired track with a desired heading; and generating a steering command based on the desired radius of curvature to a steering mechanism, the steering mechanism configured to direct the vehicle.

18 Claims, 11 Drawing Sheets

U.S. PATENT DOCUMENTS

| | | |
|---|---|---|
| 4,170,776 A | 10/1979 | MacDoran |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,813,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Pinto |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller |
| 6,014,101 A | 1/2000 | Loomis |
| 6,014,608 A | 1/2000 | Seo |
| 6,018,313 A | 1/2000 | Englemayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |

| | | | | | | |
|---|---|---|---|---|---|---|
| 6,069,583 | A | 5/2000 | Silvestrin et al. | 6,754,584 B2 | 6/2004 | Pinto et al. |
| 6,076,612 | A | 6/2000 | Carr et al. | 6,792,380 B2 | 9/2004 | Toda |
| 6,081,171 | A | 6/2000 | Ella | 6,819,269 B2 | 11/2004 | Flick |
| 6,100,842 | A | 8/2000 | Dreier et al. | 6,822,314 B2 | 11/2004 | Beasom |
| 6,104,978 | A | 8/2000 | Harrison et al. | 6,865,465 B2 | 3/2005 | McClure |
| 6,122,595 | A | 9/2000 | Varley et al. | 6,865,484 B2 | 3/2005 | Miyasaka et al. |
| 6,128,574 | A | 10/2000 | Diekhans | 6,879,283 B1 | 4/2005 | Bird et al. |
| 6,144,335 | A | 11/2000 | Rogers | 6,900,992 B2 | 5/2005 | Kelly et al. |
| 6,191,730 | B1 | 2/2001 | Nelson, Jr. | 6,922,635 B2 | 7/2005 | Rorabaugh |
| 6,191,733 | B1 | 2/2001 | Dizchavez | 6,931,233 B1 | 8/2005 | Tso et al. |
| 6,198,430 | B1 | 3/2001 | Hwang et al. | 6,961,018 B2 | 11/2005 | Heppe et al. |
| 6,198,992 | B1 | 3/2001 | Winslow | 6,967,538 B2 | 11/2005 | Woo |
| 6,199,000 | B1 | 3/2001 | Keller et al. | 6,990,399 B2 | 1/2006 | Hrazdera et al. |
| 6,205,401 | B1 | 3/2001 | Pickhard et al. | 7,006,032 B2 | 2/2006 | King et al. |
| 6,215,828 | B1 | 4/2001 | Signell et al. | 7,026,982 B2 | 4/2006 | Toda et al. |
| 6,229,479 | B1 | 5/2001 | Kozlov et al. | 7,027,918 B2 | 4/2006 | Zimmerman et al. |
| 6,230,097 | B1 | 5/2001 | Dance et al. | 7,031,725 B2 | 4/2006 | Rorabaugh |
| 6,233,511 | B1 | 5/2001 | Berger et al. | 7,089,099 B2 | 8/2006 | Shostak et al. |
| 6,236,916 | B1 | 5/2001 | Staub et al. | 7,142,956 B2 | 11/2006 | Heiniger et al. |
| 6,236,924 | B1 | 5/2001 | Motz | 7,155,335 B2 | 12/2006 | Rennels |
| 6,253,160 | B1 | 6/2001 | Hanseder | 7,162,348 B2 | 1/2007 | McClure et al. |
| 6,256,583 | B1 | 7/2001 | Sutton | 7,221,314 B2 | 5/2007 | Brabec et al. |
| 6,259,398 | B1 | 7/2001 | Riley | 7,231,290 B2 | 6/2007 | Steichen et al. |
| 6,266,595 | B1 | 7/2001 | Greatline et al. | 7,248,211 B2 | 7/2007 | Hatch et al. |
| 6,285,320 | B1 | 9/2001 | Olster et al. | 7,271,766 B2 | 9/2007 | Zimmerman et al. |
| 6,292,132 | B1 | 9/2001 | Wilson | 7,277,784 B2 | 10/2007 | Weiss |
| 6,307,505 | B1 | 10/2001 | Green | 7,292,186 B2 | 11/2007 | Miller et al. |
| 6,313,788 | B1 | 11/2001 | Wilson | 7,324,915 B2 | 1/2008 | Altman |
| 6,314,348 | B1 | 11/2001 | Winslow | 7,358,896 B2 | 4/2008 | Gradincic et al. |
| 6,325,684 | B1 | 12/2001 | Knight | 7,373,231 B2 | 5/2008 | McClure et al. |
| 6,336,066 | B1 | 1/2002 | Pellenc et al. | 7,388,539 B2 | 6/2008 | Whitehead et al. |
| 6,345,231 | B2 | 2/2002 | Quincke | 7,395,769 B2 | 7/2008 | Jensen |
| 6,356,602 | B1 | 3/2002 | Rodal et al. | 7,428,259 B2 | 9/2008 | Wang et al. |
| 6,377,889 | B1 | 4/2002 | Soest | 7,437,230 B2 | 10/2008 | McClure et al. |
| 6,380,888 | B1 | 4/2002 | Kucik | 7,451,030 B2 | 11/2008 | Eglington et al. |
| 6,389,345 | B2 | 5/2002 | Phelps | 7,479,900 B2 | 1/2009 | Horstemeyer |
| 6,392,589 | B1 | 5/2002 | Rogers et al. | 7,505,848 B2 | 3/2009 | Flann et al. |
| 6,397,147 | B1 | 5/2002 | Whitehead | 7,522,099 B2 | 4/2009 | Zhodzishsky et al. |
| 6,415,229 | B1 | 7/2002 | Diekhans | 7,522,100 B2 | 4/2009 | Yang et al. |
| 6,418,031 | B1 | 7/2002 | Archambeault | 7,571,029 B2 | 8/2009 | Dai et al. |
| 6,421,003 | B1 | 7/2002 | Riley et al. | 7,689,354 B2 | 3/2010 | Heiniger et al. |
| 6,424,915 | B1 | 7/2002 | Fukuda et al. | 2002/0038171 A1 | 3/2002 | Deguchi et al. |
| 6,431,576 | B1 | 8/2002 | Viaud et al. | 2002/0072850 A1 | 6/2002 | McClure et al. |
| 6,434,462 | B1 | 8/2002 | Bevly et al. | 2002/0165648 A1 | 11/2002 | Zeitler |
| 6,445,983 | B1 | 9/2002 | Dickson et al. | 2002/0165669 A1 | 11/2002 | Pinto et al. |
| 6,445,990 | B1 | 9/2002 | Manring | 2002/0169553 A1 | 11/2002 | Perimutter et al. |
| 6,449,558 | B1 | 9/2002 | Small | 2002/0175858 A1 | 11/2002 | Takahashi |
| 6,463,091 | B1 | 10/2002 | Zhodzicshsky et al. | 2003/0009282 A1 | 1/2003 | Upadhyaya et al. |
| 6,463,374 | B1 | 10/2002 | Keller et al. | 2003/0014171 A1 | 1/2003 | Ma et al. |
| 6,466,871 | B1 | 10/2002 | Reisman et al. | 2003/0187560 A1 | 10/2003 | Keller et al. |
| 6,469,663 | B1 | 10/2002 | Whitehead et al. | 2003/0208319 A1 | 11/2003 | Ell et al. |
| 6,484,097 | B2 | 11/2002 | Fuchs et al. | 2004/0039514 A1 | 2/2004 | Steichen et al. |
| 6,501,422 | B1 | 12/2002 | Nichols | 2004/0186644 A1 | 9/2004 | McClure et al. |
| 6,515,619 | B1 | 2/2003 | McKay, Jr. | 2004/0210357 A1 | 10/2004 | McKay et al. |
| 6,539,303 | B2 | 3/2003 | McClure et al. | 2004/0212533 A1 | 10/2004 | Whitehead et al. |
| 6,542,077 | B2 | 4/2003 | Joao | 2005/0080559 A1 | 4/2005 | Ishibashi et al. |
| 6,553,299 | B1 | 4/2003 | Keller et al. | 2005/0225955 A1 | 10/2005 | Grebenkemper et al. |
| 6,553,300 | B2 | 4/2003 | Ma et al. | 2005/0265494 A1 | 12/2005 | Goodlings |
| 6,553,311 | B2 | 4/2003 | Aheam et al. | 2006/0031664 A1 | 2/2006 | Wilson et al. |
| 6,570,534 | B2 | 5/2003 | Cohen et al. | 2006/0167600 A1 | 7/2006 | Nelson et al. |
| 6,577,952 | B2 | 6/2003 | Geier et al. | 2006/0206246 A1 | 9/2006 | Walker |
| 6,587,761 | B2 | 7/2003 | Kumar | 2006/0215739 A1 | 9/2006 | Williamson et al. |
| 6,606,542 | B2 | 8/2003 | Hauwiller et al. | 2007/0078570 A1 | 4/2007 | Dai et al. |
| 6,611,228 | B2 | 8/2003 | Toda et al. | 2007/0088447 A1 | 4/2007 | Stothert et al. |
| 6,611,754 | B2 | 8/2003 | Klein | 2007/0121708 A1 | 5/2007 | Simpson |
| 6,611,755 | B1 | 8/2003 | Coffee et al. | 2007/0205940 A1 | 9/2007 | Yang et al. |
| 6,622,091 | B2 | 9/2003 | Perlmutter et al. | 2007/0285308 A1 | 12/2007 | Bauregger et al. |
| 6,631,394 | B1 | 10/2003 | Ronkka et al. | 2008/0129586 A1 | 6/2008 | Martin |
| 6,631,916 | B1 | 10/2003 | Miller | 2008/0204312 A1 | 8/2008 | Euler |
| 6,643,576 | B1 | 11/2003 | O'Connor et al. | 2009/0171583 A1 | 7/2009 | DiEsposti |
| 6,646,603 | B2 | 11/2003 | Dooley et al. | 2009/0174587 A1 | 7/2009 | DiLellio et al. |
| 6,657,875 | B1 | 12/2003 | Zeng et al. | 2009/0174622 A1 | 7/2009 | Kanou |
| 6,671,587 | B2 | 12/2003 | Hrovat et al. | 2009/0177395 A1 | 7/2009 | Stelpstra |
| 6,686,878 | B1 | 2/2004 | Lange | 2009/0177399 A1 | 7/2009 | Park et al. |
| 6,688,403 | B2 | 2/2004 | Bernhardt et al. | 2009/0259397 A1 | 10/2009 | Stanton |
| 6,703,973 | B1 | 3/2004 | Nichols | 2009/0259707 A1 | 10/2009 | Martin et al. |
| 6,711,501 | B2 | 3/2004 | McClure et al. | 2009/0262014 A1 | 10/2009 | DiEsposti |
| 6,732,024 | B2 | 5/2004 | Rekow et al. | 2009/0262018 A1 | 10/2009 | Vasilyev et al. |
| 6,744,404 | B1 | 6/2004 | Whitehead et al. | 2009/0262974 A1 | 10/2009 | Lithopoulos |

| | | |
|---|---|---|
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Bing-Fei |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | van Diggelen et al. |
| 2010/0124210 A1 | 5/2010 | Lo |
| 2010/0124212 A1 | 5/2010 | Lo |
| 2010/0134354 A1 | 6/2010 | Lennen |
| 2010/0149025 A1 | 6/2010 | Meyers et al. |
| 2010/0149030 A1 | 6/2010 | Verma et al. |
| 2010/0149033 A1 | 6/2010 | Abraham |
| 2010/0149034 A1 | 6/2010 | Chen |
| 2010/0149037 A1 | 6/2010 | Cho |
| 2010/0150284 A1 | 6/2010 | Fielder et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |
| 2010/0171660 A1 | 7/2010 | Shyr et al. |
| 2010/0171757 A1 | 7/2010 | Melamed |
| 2010/0185364 A1 | 7/2010 | McClure |
| 2010/0185366 A1 | 7/2010 | Heiniger et al. |
| 2010/0185389 A1 | 7/2010 | Woodard |
| 2010/0188285 A1 | 7/2010 | Collins |
| 2010/0188286 A1 | 7/2010 | Bickerstaff et al. |
| 2010/0189163 A1 | 7/2010 | Burgi et al. |
| 2010/0207811 A1 | 8/2010 | Lackey |
| 2010/0210206 A1 | 8/2010 | Young |
| 2010/0211248 A1 | 8/2010 | Craig et al. |
| 2010/0211315 A1 | 8/2010 | Toda |
| 2010/0211316 A1 | 8/2010 | DaSilva |
| 2010/0220004 A1 | 9/2010 | Malkos et al. |
| 2010/0220008 A1 | 9/2010 | Conover et al. |
| 2010/0222076 A1 | 9/2010 | Poon et al. |
| 2010/0225537 A1 | 9/2010 | Abraham |
| 2010/0228408 A1 | 9/2010 | Ford |
| 2010/0228480 A1 | 9/2010 | Lithgow et al. |
| 2010/0231443 A1 | 9/2010 | Whitehead |
| 2010/0231446 A1 | 9/2010 | Marshall et al. |
| 2010/0232351 A1 | 9/2010 | Chansarkar et al. |
| 2010/0235093 A1 | 9/2010 | Chang |
| 2010/0238976 A1 | 9/2010 | Young |
| 2010/0241347 A1 | 9/2010 | King et al. |
| 2010/0241353 A1 | 9/2010 | Park |
| 2010/0241441 A1 | 9/2010 | Page et al. |
| 2010/0241864 A1 | 9/2010 | Kelley et al. |

FOREIGN PATENT DOCUMENTS

| | | |
|---|---|---|
| WO | WO98/36288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO-2009082745 | 7/2009 |
| WO | WO-2010005945 | 7/2009 |
| WO | WO2009126587 | 10/2009 |
| WO | WO2009/148638 | 12/2009 |
| WO | WO-2010104782 | 9/2010 |
| WO | WO-2011014431 | 2/2011 |

OTHER PUBLICATIONS

"ISO", 11783 Part 7 Draft Amendment 1 Annex, Paragraphs B.6 and B.7.ISO 11783-7 2004 DAM1, ISO: Mar. 8, 2004.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

"ISR Notification & Written Opinion", PCT/US10/26509, (Apr. 20, 2010),1-7.

"Notification Concerning Transmittal of International Report on Patentability (PCT)", PCT/US2009/049776, (Jan. 20, 2011).

"Notification of Transmittal of InternatinalPrelim. Report of Patentability", International Application No. PCT/US09/039686, (Oct. 21, 2010).

"International Search Report and Written Opinion", PCT/US2010/043094, (Sep. 17, 2010).

"Notification of Publication of International Application", WO 2011/014431, (Feb. 3, 2011).

"International Search Report and Written Opinion", PCT/US08/81727, (Dec. 23, 2008).

"International Search Report", PCT/US09/33567 (Feb. 9, 2009).

"International Search Report and Written Opinion", PCT/IB2008/003796, (Jul. 15, 2009).

"International Search Report / Written Opinion", PCT/US09/63594, (Jan. 11, 2010).

"International Search Report", PCT/US09/067693, (Jan. 26, 2010).

"International Search Report and Written Opinion", PCT/US10/21334, (Mar. 12, 2010).

Rho, Hyundho et al., "Dual-Frequency GPS Precise Point Positioning with WADGPS Corrections", [retrieved on May 18, 2010]. Retrieved from the Internet: URL: http://gauss.gge.unb.ca/papers.pdf/iongnss2005.rho.wadgps.pdf. (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the Internet: <http://nng.esoc.esa.de/ws2006/REPR2.pdf>, (May 8, 2006).

"International Search Report", PCT/US10/26509, (Apr. 20, 2010).

"International Search Report and Written Opinion", *International Searching Authortiy*, PCT/US08/88070, Feb. 9, 2009.

Parkinson, Bradford W., et al., "Global Positioning System: Theory and Applications, vol. II", Bradford W. Parkinson and James J. Spiker. Jr., eds., *Global Postioning System: Theory and Applicaitons, vol. II, 1995, AIAA*, Reston, VA, USA, pp. 3-50, (1995),3-50.

"Orthrnan Manufacturing Co., www.orthman.com/htm;guidance. htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1, Monetrey, California American Institute of Aeronautics and Astronautics, Inc.*, (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc,.

Park, Chansik et al., "Integer Ambiguity Resolution for GPS Based Attitude Determination System", *SICE* 1998. Jul. 29-31, *Chiba*, 1115-1120.

Last, J. D., et al, "Effect of skywave interference on coverage of radiobeacon DGPS stations", *IEEE Proc.-Radar. Sonar Navig.*, vol, 144, No. 3, Jun. 1997, pp. 163-168.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF interference Conditions", *11th Int. Tech Meeting of the Satellite Division of the U.S. Inst. of Navigation*, Nashville, TN. Sep. 15-18, 783-795, 1998.

Keicher, R. at al., "Automatic Guidance for Agricultural Vehicles in Europe", *Computers and Electronics in Agriculture*, vol. 25, (Jan. 2000), 169-194.

Takac, Frank et al.,"SmartRTK: A Novel Method of Processing Standardised RTCM Network RTK Information for High Precision Positioning", *Proceedings of ENC GNSS* 2008, Toulouse, France (Apr. 22, 2008).

"International Search Report", PCT/US09/49776, (Aug. 11, 2009).

"International Search Report", PCT/AU/2008/000002, (Feb. 28, 2008).

"International Search Report", PCT/US09/33693, (Mar. 30, 2009).

"International Search Report", PCT/U09/039686, (May 26, 2009).

"International Search Report", PCT/US09/34376, (Nov. 2, 2009).

"International Search Report", PCT/US09/60668.

SATELLITE BASED VEHICLE GUIDANCE CONTROL IN STRAIGHT AND CONTOUR MODES

CROSS-REFERENCE TO RELATED APPLICATIONS

This application is a continuation-in-part of and claims the benefit of: U.S. patent application Ser. No. 10/804,721, filed Mar. 19, 2004 now U.S. Pat. No. 7,437,230, which claims the benefit of U.S. Provisional Patent Application No. 60/456, 130, filed Mar. 20, 2003. This application is related to U.S. patent application Ser. No. 12/171,399, filed Jul. 11, 2008. The contents of all of the aforementioned applications are incorporated by reference.

BACKGROUND

The invention relates to the use of satellite systems to control the guidance of vehicles and the positioning of towed implements; more particularly, steering control of agricultural, mining, and construction vehicles. For example, there is a need to accurately position agricultural vehicles and their implements (generally towed) used for plowing, listing, planting of crops, mechanically cultivating around crops and applying chemicals on and around crops. These techniques strive to minimize overlapping of rows and gaps between rows and reduce damage to crops by physical contact, and thereby result in higher crop yield, faster field operations and decreased costs to the farmer.

One approach for providing steering cues with Global Positioning System (GPS) and Differential Global Positioning Systems (DGPS) is with a light bar. The light bar typically supplies numerical and graphical information to an operator directing the desired steering. Information displayed in bright light emitting diode (LED) aid liquid crystal display (LCD) indicators are used both inside the cab or mounted outside on the hood of a vehicle to reduce eyestrain and remain within peripheral vision. Various numerical and graphical displays of cross track error (a positional error from a desired line), angle of approach (angle between current heading and desired line heading) and steering guides (angle to turn the steering wheel to move to and stay on the desired track), have been used.

Straight, or parallel, guidance uses two points, typically defined as A and B points and gives effective guidance along the line joining those points and lines offset from those lines; this offset is normally defined as the swath width of the implement. Contour guidance in several forms has been developed, with some generating a new line using data offset from the last driven line, and some using a more sophisticated approach of generating guidance continuously in real time to the closest point of all previously driven areas.

Dual frequency real-time kinematic (RTK) receivers have been used, with dual and triple antenna configurations coupled with combinations of Inertial Navigation System (INS) sensors, and gyros using sophisticated Kalman filtering techniques. Other systems utilize a three-axis inertial navigation system (INS) with a radar input for speed. These have been used for automatic steering of a main vehicle e.g., tractor and are often used on large farms where high value crops are grown and operators are not well trained in driving. Unfortunately, most inertial and gyro based systems are expensive and large.

Existing auto steer guidance methods solve the positioning of the vehicle in straight-line guidance mode, but do not necessarily address the positioning of the implement. In practice, large implements may be moved sideways by hitting rocks or differing soil conditions on each side as they are dragged, and the like. It will be appreciated that implements towed farther behind the vehicle are more susceptible to such deviation than those closely coupled to the vehicle.

Correction for positioning of the towed implement with DGPS has also been developed with the use of a movable hitch pin. This is used in both straight and contour line following. It is also used in a follow-me mode, where the magnitude of the radius of curvature, derived from the DGPS headings and speed, is used to proportionally move out the implement control mechanism, thus enabling the implement to follow in the tracks of the tractor and minimize crop damage. Correction for positioning of the towed implement with DGPS has also been developed with the use of a 3-point hitch and a steerable implement. In this instance, a second GPS antenna is attached to the implement with the cross track position used as the feedback error.

As farming becomes increasingly mechanized and farm implements faster and larger, so too does the difficulty of accurate positioning. The need is for a low cost solution to be used on many farm vehicles as a driver aid to enable the driver to concentrate on other tasks associated with field and implement operations to relieve the operator from the continuous monitoring and adjustment of steering.

BRIEF SUMMARY

Disclosed herein in an exemplary embodiment is a method for steering an agricultural vehicle comprising: receiving global positioning system (GPS) data including position and velocity information corresponding to at least one of a position, velocity, and course of the vehicle; receiving a yaw rate signal corresponding to a yaw rate of the vehicle; and computing a compensated heading for the vehicle based on an integration of the yaw rate signal, the compensated heading comprising a blend of the yaw rate signal with heading information based on the GPS data, wherein the compensated heading is further dynamically calibrated based on the GPS data. For each desired swath comprising a plurality of desired positions and desired headings, the method also comprises: computing an actual track and a cross track error from the desired swath based on the compensated heading and the position, wherein the position is compared with a selected desired position of the plurality of desired positions and the compensated heading is compared with a selected desired heading of the plurality of desired headings; calculating a desired radius of curvature to arrive at the desired track with a desired heading; and generating a steering command based on the desired radius of curvature to a steering mechanism, the steering mechanism configured to direct the vehicle.

Further disclosed herein in another exemplary embodiment is a system for steering an agricultural vehicle comprising: a means for receiving global positioning system (GPS) data including position and velocity information corresponding to at least one of a position, velocity, and course of the vehicle; a means for receiving a yaw rate signal corresponding to a yaw rate of the vehicle; and a means for computing a compensated heading for the vehicle based on an integration of the yaw rate signal, the compensated heading comprising a blend of the yaw rate signal with heading information based on the GPS data, wherein the compensated heading is further dynamically calibrated based on the GPS data. For each desired swath comprising a plurality of desired positions and desired headings, the system further includes: a means for computing an actual track and a cross track error from the desired swath based on the compensated heading and the position, wherein the position is compared with a selected desired position of the plurality of desired positions and the compensated heading is compared with a selected desired heading of the plurality of desired headings; a means for calculating a desired radius of curvature to arrive at the designed track with a desired heading; and a means for generating a steering command based on the desired radius of curvature to a steering mechanism, the steering mechanism configured to direct the vehicle.

Disclosed herein in yet another exemplary embodiment is a storage medium encoded with a machine-readable computer program code, wherein the storage medium includes instructions for causing a computer to implement the abovementioned method for steering an agricultural vehicle.

Also disclosed herein in yet another exemplary embodiment is a computer data signal embodied in a computer-readable medium wherein the computer data signal comprises code configured to cause a computer to implement the abovementioned method for steering an agricultural vehicle.

BRIEF DESCRIPTION OF THE DRAWINGS

Referring now to the drawings wherein like elements are numbered alike in the several FIGURES.

DETAILED DESCRIPTION OF AN EXEMPLARY EMBODIMENT

Figure 1:
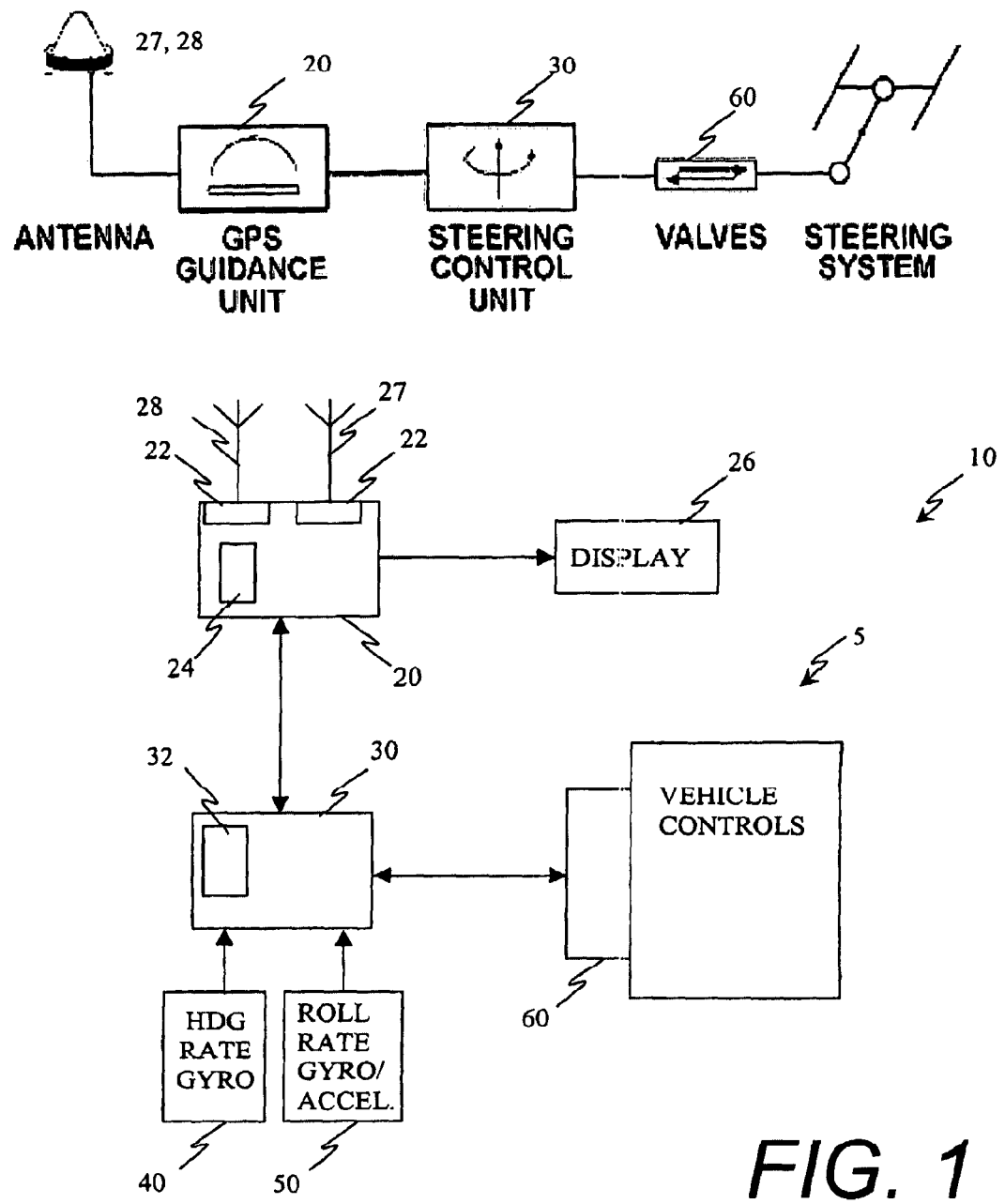
FIG. 1 depicts an illustrative diagram of a vehicle including an exemplary embodiment.

Referring to FIG. 1, an exemplary embodiment of a guidance system 10 for a vehicle 5 includes, but is not limited to, two primary components: a DGPS guidance unit 20 and a steering control unit (SCU) 30. In the DGPS guidance unit 20, a DGPS receiver 22 is connected to a controller, e.g., processor 24, which generates a graphical and numerical display 26 for an operator and processes the control signal guidance algorithms. This controller 24 communicates with a controller 32 in the steering control unit 30 to direct the vehicle 5. It will be appreciated that the guidance unit 20 may include additional elements such as the antennae 27 and 28 for UPS and GPS differential corrections and other interfaces.

The steering control unit 30 includes a controller 32 that interfaces with a heading rate gyro 40 and cross aligned accelerometer and roll rate gyro 50 and generates steering control signals for hydraulically or electrically controlled steering mechanisms of the vehicle. The steering control unit 30 is optimized for maximum flexibility during agricultural use, making installations fast and readily transferable to other vehicles 5. The steering control unit 30 of an exemplary embodiment includes a heading rate gyro 40, which should be mounted with axis vertical as low as is feasible on the vehicle.

Continuing with FIG. 1, in an exemplary embodiment, the controller/processor 32 of the steering control unit 30 is operably connected with a proportional or on/off hydraulic or electrically operated valve system 60. In an exemplary embodiment, the hydraulic valve system 60 is operably connected, substantially in parallel, with the existing vehicle steering hydraulics to provide fluid flow to turn the steering mechanism of the vehicle 5. The hydraulic valve system 60 is set to operate at a low flow rate, preferably, to ensure that an operator can override it with modest effort. A gain adjustment allows operator fine-tuning of the responsiveness of the system while preferably maintaining a generic installation kit of valves, hoses and fittings that is applicable over a wide range of vehicles 5.

Either proportional control valves (PCV) or directional control valves (DCV) may be utilized in the guidance system 10 to turn the steering system until the vertical axis rate gyro rate matches that of the desired curvature from the guidance unit 20. In an exemplary embodiment, a dead zone and system gain factor may be employed and arranged to be user-configurable to ensure the guidance system 10 and control loops provide desirable response characteristics. For example, the control commands from the steering control unit 30 and hydraulic valve system 60 may be configured to ensure that they do not exhibit jitter or utilize unacceptable oscillations. Such a configuration may be setup during initial installation and testing of the hydraulics control and hydraulic valve system 60. In an exemplary embodiment, the DCV may be operated in a pseudo-proportional mode to improve performance.

Figure 2A:
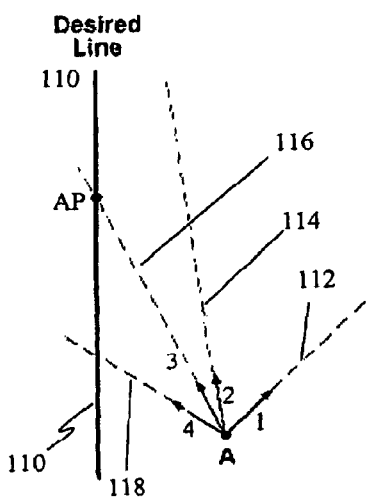
FIG. 2 depicts an illustrative block diagram of vehicle including an exemplary embodiment of a sensor system.
Figure 2B:
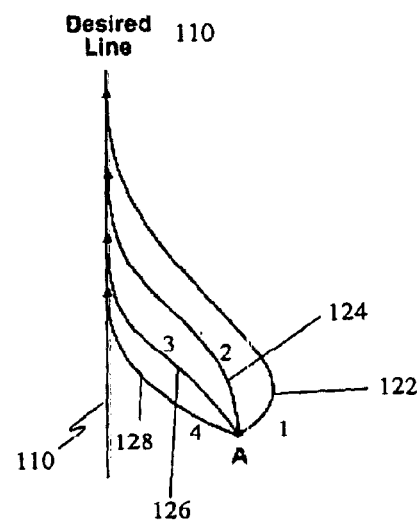

Referring now to FIGS. 2A and 2B, in operation of an exemplary embodiment, the guidance system 20 generates commands to direct the vehicle 5 towards the aim point AP and desired line 110 which will be described in detail at a later point herein. As the vehicle 5 proceeds towards the desired line 110 the aim point AP advances and the required curvature reduces. Therefore, the hydraulic valve system 60 output, in the case of a PCV, is reduced to match. It will be appreciated that the gyro rate is reduced and eventually zeroed with minimal overshoot. The system with a forward aim point AP exhibits stability by always tracking to the desired path and requiring minimal operator intervention.

In order to perform the prescribed functions and desired processing, as well as the computations therefore (e.g., the vehicle guidance, and the like), the guidance system 10, and more particularly, the guidance unit 20 and/or steering control unit 30 and controller/processor 32, may include, but is not limited to, a computer system including central processing unit (CPU), display, storage and the like. The computer system may include, but not be limited to, a processor(s), computer(s), controller(s), memory, storage, register(s), timing, interrupt(s), communication interface(s), and input/output signal interfaces, and the like, as well as combinations comprising at least one of the foregoing. For example, a computer system may include signal input/output for controlling and receiving signals from the guidance unit 20 as described herein. Additional features of a computer system and certain processes executed therein may be disclosed at various points herein.

The processing performed throughout the guidance system 10 may be distributed in a variety of manners as will also be described at a later point herein, e.g., distributing the processing performed in one or more modules and among other processors employed. In addition, processes and data may be transmitted via a communications interface, media and the like to other processors for remote processing, additional processing, storage, and database generation. Such distribution may eliminate the need for any such component or process as described or vice versa, combining distributed processes in various computer systems. Each of the elements described herein may have additional functionality that will be described in more detail herein as well as include functionality and processing ancillary to the disclosed embodiments. Naturally, these units and processes can be combined in the same or separate enclosures.

As used herein, signal connections may physically take any form capable of transferring a signal, including, but not limited to, electrical, optical, or radio. Communication between the various units can be by hard wired, or wireless, serial communication, or other protocol standard for agricultural vehicles, but any extension to radio communication is also possible.

In an exemplary embodiment, additional considerations are made to ensure the vehicle is operating as commanded and not deviating from the desired path. Communication between the guidance unit 20 and steering control units 30 may include but not be limited to, a status message. Limited user selectable adjustment is enabled. When these limits are triggered messages are sent to disable automatic steering. These limits may include, but not be limited to the following as well as combinations including at least one thereof:

minimum and maximum speed;
  maximum cross track;
  maximum current heading to desired heading;
  maximum turn rate, speed dependent;
  maximum difference between current turn rate and desired turn rate.

In an exemplary embodiment, these limits would be software-enabled and disable automatic steering guidance as provided by the guidance system 10. This includes whenever the operator takes over control on turns. The valves of the hydraulic control system 60 are then closed to new fluid flow and the ability to automatically manipulate the vehicle steering system is disabled. Full manual control is restored immediately.

A manual switch operably connected to the guidance system 10 also allows software disabling steering control. Moreover, a manual switch is also provided that allows an operator to physically disconnect the electrical control to the valves. The power switch for the steering control unit will also turn off steering control. In an exemplary embodiment, operator intervention is required to reinstate auto steering guidance; however, automated response is also conceivable.

In yet another exemplary embodiment, a calculated desired rate of turn for the vehicle 5 is compared with a rate of turn, ROT, in degrees per second, as may be measured with an inexpensive, mounted on board, rate gyro 40. The following equation identifies the desired rate of turn ROT:

$$ROT = speed*180/(pi*R) = \text{rate of turn in degrees per second}$$

where:
  R=Circle of radius R in meters;
  Speed=speed in meters/second m/s;
  2 pi R/speed=the time to travel a complete 360 degree circle.

In an exemplary embodiment, a Kalman filter control loop is implemented and configured to substantially match measured vehicle rate from the rate gyro 40 with the desired steering curvature. It will be appreciated that in general, a rate gyro 40 is very sensitive and exhibits minimal latency. In addition, the control loop facilitates generation of a stabilized, filtered heading angle computation based on GPS data and integration of the rate information from the rate gyro 40. Therefore, a blend of the yaw rate signal with the heading information is accomplished, which takes advantages of the superior characteristics of both sensors while eliminating some of the inferior characteristics. In particular, the yaw rate signal exhibits high short-term/dynamic accuracy relative to the GPS-based heading information, while the GPS-based heading information exhibits high long-term (low dynamics) accuracy relative to the yaw rate signal.

In an exemplary embodiment, a gyro calibration method brings the rate gyro 40 to stability within a few minutes of power application. Calibration includes two portions, one for a rate bias drift and one for scale factor. The rate bias is calculated when the vehicle 5, and thereby, the guidance system 10, is turning at less than a selected residual limit in either direction. Additionally, the bias may be dynamically adjusted with filtering. For example, in an exemplary embodiment, a low pass filter is employed. The scale factor is determined when the vehicle 5, and thereby, the guidance system 10, is turning at a rate in excess of a selected threshold. The derivative of the DGPS computed heading may be compared with the rate from the rate gyro 40 to provide a correction of the scale factor. In an exemplary embodiment, the comparison is ratiometric. Moreover, once again, the correction may be filtered to provide a dynamic correction. It will be appreciated that application of scale factor corrections may be limited to small magnitude adjustments. It is advantageous to find that in the normal turning radius of contour driving or straight mode, the abovementioned techniques provide excellent results for calibration of the desired rate of turn.

After a few minutes of being powered on the operation, the rate gyro 40 has stabilized sufficiently for drift and gain calibration to be fully usable. The steering control unit 30 then provides gyro corrected heading to the guidance unit 20 for incorporation. It will be appreciated that this approach improves accuracy and reduces the noise of the DGPS-derived heading significantly and improves the accuracy and stability of the curvature calculations. Moreover, this approach further reduces the susceptibility of the system to noise, especially roll-induced noise from the DGPS antenna 26, typically mounted on the roof of the tractor and susceptible to bouncing and rocking and rolling in rough fields.

Controller Implementation

In an exemplary embodiment, the desired curvature is sent from the DGPS guidance unit 20 to the SCU 30 at 10 Hz over a Controller Area Network (CAN) bus using a proposed ISO standard protocol. The following formulae are employed:

$$\text{Desired Radius (m)} = 1/\text{Desired Curvature (km}^{-1}) * 1000.$$

$$\text{Desired Rate (deg/s)} = 360*\text{Speed (m/s)}/2*Pi*\text{Desired Radius (m)}. \text{ Error (deg/s)} = \text{Desired Rate (deg/s)} - \text{Actual Rate (deg/s)}.$$

Output=Proportional Gain*Error+Integral Gain*Integral (Error)+Derivative Gain*Derivative (Error).

The error is signal-generated as the difference from the desired turn rate and the actual gyro-derived turn rate. When the error is within the dead band, only the integral term is used for the output, optimizing system stability.

The controller has two fundamental modes of operation depending on the type of control valve used: a true proportional control mode and a pseudo-proportional control mode.

True proportional control is used when a proportional control valve (PCV) is available. The absolute value of the output corresponds to a duty cycle of a pulse width modulated (PWM), (1 KHz) output. The output may be scaled between minimum (0-100) and maximum (min-100) as an Output value.

Pseudo-Proportional Control Mode provides time-based proportional control for systems with a directional control valve, DCV. The time-based proportional control algorithm uses the Output value from the proportional, integral and derivative (PID) algorithm above.

In an exemplary embodiment, a loop running at 100 Hz is used to control the output in this mode. Therefore, the resolution of On-Time and Off-Time is 10 milliseconds.

In an exemplary embodiment, the following logic is used to generate the pseudo proportional control:

---

On-Time (milliseconds) = (abs (Output) / 100) * Period (milliseconds)
If On-Time > Maximum On-Time (Period) Then
    On-Time = Period
End If
Off-Time (milliseconds) = Period (milliseconds) – On-Time (milliseconds)
If the On-Time is less than some Minimum On-Time, then the On-Time is set to the Minimum On-Time and the off-time is extended proportionally.
If On-Time > 0 AND On-Time < Minimum On-Time The
    Off-Time = Minimum On-Time * Period / On-Time – Minimum On-Time On-Time = Minimum On-Time
End If
If the Off-Time is less than some Minimum Off-Time, then the Off-Time is set to 0 and the On-Time is set to Period.
If Off-Time > 0 AND Off-Time <Minimum Off-Time Then
    Off-Time = 0
    On-Time = Period
End If

---

When the error is inside the dead band in this mode, the output is turned off.

Kalman Filter Implementation

In an exemplary embodiment a Kalman filter is used to provide the SCU 30 with unbiased rate measurements. The angle estimate is also fed back to the command-side of the guidance system 20 for use in future Desired Curvature calculations, at 10 Hz over the CAN bus using proprietary messages (e.g. ISO 11783). The command-side and the control-side of the automatic steering system are tightly coupled in this respect.

The Kalman filter is an optimal estimation algorithm which is used to fuse the partially redundant data (sensor fusion) between the GPS heading and the integrated rate gyro output to compute an estimate of the vehicle's yaw angle, the rate gyro bias, and the rate gyro's scale factor. It looks at the error characteristics of the gyro 40 and the error characteristics of the GPS and determines an estimate, which is a probabilistically optimal combination of both signals. The rate gyro 40 has excellent short-term error characteristics and has relatively low noise compared to the GPS which has excellent long-term error characteristics but has high noise cause in part by high frequency roll. Combining the two signals gives an optimal estimate. The gyro characteristics make the signal smooth. The GPS characteristics make the signal unbiased. The Kalman filter does not run when there is no GPS signal. In an exemplary embodiment, the Kalman filter does not update the estimates when the vehicle speed is below 1 mph. If the vehicle speed goes below 1 mph, a flag is set. When the vehicle speed crosses 1 mph, the Kalman angle estimate is set to the current GPS measurement and the error covariance for the angle estimate is reset.

$Q_T$—true angular rate (deg/s)
$Q_{gyro}$—gyro measurement (deg/s)
a—gyro scale factor
β—gyro bias
$\theta_T$—true angle (deg)
χ—Kalman state column vector
θ-angle estimate
b—bias estimate
a—scale factor estimate
A—state transition matrix
w—process noise
Q—process noise variance matrix
$Q_{meas}$—angle measurement (GPS heading in degrees)
v—measurement noise
H—measurement row vector
R—measurement noise variance Gyro Model:

$$\theta_T = \alpha \cdot \theta_{gryo} + \beta$$

$$\theta_T = \int_o^T \theta_T \cdot dt = \alpha \cdot \int_o^t \theta_{gyro} \cdot dt + \beta \cdot T \approx \alpha \cdot \sum_o^r \theta_{gyro} \cdot \Delta t + \beta \cdot T$$

Process Model:

$$x_k = A \cdot x_{K-1} + w$$

$$x = \begin{bmatrix} \theta \\ \beta \\ \alpha \end{bmatrix} \quad A = \begin{bmatrix} 1 & T & \sum_o^T \theta_{gyro} \cdot \Delta T \\ 0 & 1 & 0 \\ 0 & 0 & 1 \end{bmatrix} \quad Q = \begin{bmatrix} \sigma_{w\theta}^2 & 0 & 0 \\ 0 & \sigma_{w\beta}^2 & 0 \\ 0 & 0 & \sigma_{w\alpha}^2 \end{bmatrix}$$

$$\begin{bmatrix} \theta_k \\ \beta_k \\ \alpha_k \end{bmatrix} = \begin{bmatrix} 1 & T & \sum_o^T \theta_{gyro} \cdot \Delta T \\ 0 & 1 & 0 \\ 0 & 0 & 1 \end{bmatrix} \cdot \begin{bmatrix} \theta_{k-1} \\ \beta_{k-1} \\ \alpha_{k-1} \end{bmatrix} + w$$

Measurement Model:

$$\theta_{meas} = H \cdot \chi + vH = [1\ 0\ 0]R = \sigma_v^2$$

Velocity Compensation

It will be appreciated that the speed or velocity provided from the DGPS receiver 22 or the guidance unit 20 is typically provided in North and East components with low noise, based on the phase tracking of the GPS satellites. It will further be appreciated that applications exist to generate velocity signals based on distance across the ground. Such systems have typically utilized wheel sensors or radar systems. Unfortunately, these methods are subjected to errors through slippage, blockage, dirt and reflection from thick grasses. A problem with the speed from a GPS system is the noise from the rock and/or roll of the cab, particularly laterally when the GPS antenna is located on the top of the cab. Such motion increases the measured distances resulting in errors in outputs. In yet another exemplary embodiment, a method is provided to rotate the north and east speed components of the GPS solution into along track and cross track components using the heading information for the vehicle. A heading signal, based in one exemplary embodiment, on the calibrated integrated rate gyro and course information from the UPS derived and computed as discussed above, is employed to facilitate the rotation. It will be appreciated that noise effects from the high mounted antenna 27 on the vehicle 5 moving through a rough field are transferred to the along track and cross-track components of the velocity. However, advantageously, noise in the along track component is normally significantly less than the along track velocity, and so when integrated, the noise effects are substantially eliminated. Advantageously, this means that integrating the along track component of velocity yields a more accurate distance traveled estimate than would be achieved with existing methodologies.

The benefits of a more accurate distance traveled estimate may readily be employed for improved accuracy, e.g., in agriculture, the planting, of individual seeds through air injection. This method would also allow the synchronization of subsequent passes across the field in the optimal positioning of fertilizer or in offsetting plant positions by row. Moreover, an improved along track speed may be employed by the guidance system 20 to facilitate forward prediction calculations.

Likewise, the cross-track speed may readily be integrated to provide a cross track error that still exhibits fast responsiveness to real changes but eliminates most of the high frequency noise induced components from the rolling of the vehicle. Such a cross track error may further be biased to match the supplied DGPS-derived cross track. The resultant roll compensated cross track distance may thereafter be utilized in the guidance system 20 for improved guidance display and steering control when operating in rough terrain.

Turning now to the methodology for determining the guidance and steering commands to direct a vehicle 5. Disclosed herein in an exemplary embodiment is a method wherein a radius of curvature of a curved vehicle track, which would bring the vehicle 5 from its current position to the desired aim point, (hereinafter also denoted AP) is calculated. This radius is generated from the current position, speed, heading and the aim point AP. This desired radius of curvature, heading and speed are then sent to the steering control unit. The method operates both in straight and contour guidance modes with an aim point AP being generated using either points on the straight line or a best fit of points logged or generated as the guidance line or from the previous guidance edge of the swath width. Advantageously, the current method allows use of guidance systems with various levels of accuracy and cost with the ability to correct for system drift and the offsets of current row or crop positioning. The current system utilizes two dimensional DGPS velocity only, matching desired turn rate to a hard-mounted, single axis, real time calibrated, rate gyro. The aim point, AP, can dynamically be moved based on ground speed and vehicle heading to improve the move onto line as well as on line tracking.

Straight Line Steering Using Turn Rate

Figure 8:
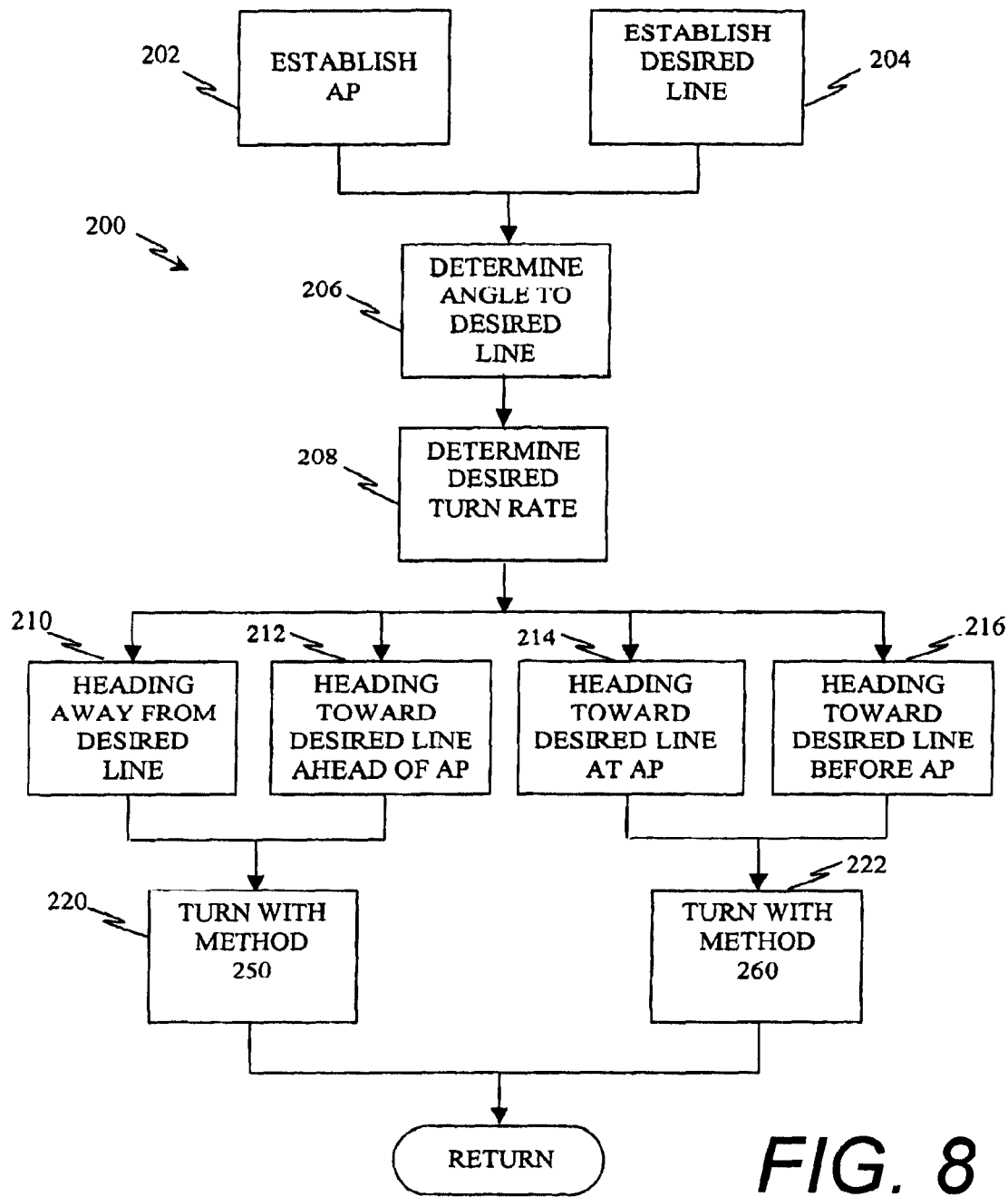
FIG. 8 depicts an illustrative flowchart depicting a methodology for acquiring the desired line in accordance with an exemplary embodiment of the invention.

Turning now to FIGS. 2A and 2B, as well as FIG. 8 depicting the particulars of one exemplary methodology 200 for guidance of a vehicle 5. In an exemplary embodiment, for a selected desired line 110 and aim point denoted AP, an angle relative to the desired line is determined as depicted at process blocks 202, 204, and 206. Furthermore, as depicted at block 208, the desired turn rate is determined. In an exemplary embodiment, the desired turn rate is that turn rate, which the vehicle 5 should preferably attain to swing smoothly onto the desired line 110 to an aim point AP with substantially no overshoot while in a straight guidance mode. This aim point AP is calculated from a speed varying distance ahead of the vehicle on the desired path. It will be appreciated that the aim point AP is configured as a "moving target", in that it is never actually reached, but is instead the goal of the steering system. The vehicle 5 can be heading and/or turning in any direction initially but the method 100 will swing the vehicle around to eventually reach the instantaneous optimal turn rate, tracking to the line.

In an exemplary embodiment of the methodology 200, the guidance system 10 responds in one of four ways, depending on the initial heading of the vehicle relative to the desired line 110 and aim point, AP, and the current position as depicted at process blocks 206 and 208. These responses are mirrored for guidance starting from either side of the desired line 110. However, only the right-hand side of the line is depicted in the figures.

As depicted at process blocks 210 and 220, if the vehicle 5 is initially heading away from the desired line 110, as depicted in FIG. 2A as direction 1, 112, the guidance system 10 will turn the vehicle employing methodology 250 to follow path 1, 122 as depicted in diagram of FIG. 2B.

As depicted at process blocks 212 and 220, if the initial heading of the vehicle 5 is directed toward the desired line 110 but beyond the aim point AP, as in heading 2, 114, methodology 250 is employed and the path followed to the desired line 110 will be path 2, 124, of FIG. 2B.

Furthermore, as depicted in process blocks 214 and 222, if the initial heading is aiming directly at the aim point AP, as depicted by heading 3, 116, then the desired turn rate will initially be zero. As the aim point AP moves ahead on the desired line 110 and the vehicle 5 approaches the line, the aim point AP advances along the desired line 110 and the guidance system 10 reverts to methodology 260 described below to approach the desired line 110. Under such conditions, the path followed to the desired line 110 will be path 3, 126, as depicted in FIG. 2B.

Finally, as depicted by process blocks 216 and 222, if the initial heading of the vehicle 5 would cause the vehicle 5 to intersect the desired line 110 before the aim point AP, as depicted with heading 4, 118, of FIG. 2A, the guidance system 10 employs turning methodology 260 and follows path 4, 128, to acquire the desired line 110.

In an exemplary embodiment, two methodologies 250 and 260 are employed for tracking onto the desired line 110, depending on whether the guidance system 10 needs to curve towards the desired line 110 or needs to "feather out" the approach to ensure it minimizes overshoot of the desired line 110. As described above, the approach selected is determined by whether the current heading of the vehicle 5 is aiming beyond the aim point AP as in 210 and 212 above, or before it, as in 214 and 216 above.

The first methodology 250 uses an extension of existing steering techniques described in U.S. Pat. No. 6,539,303, entitled: GPS Derived Swathing Guidance System, to McClure et al. issued Mar. 25, 2003 and U.S. CIP patent application Ser. No. 10/396,788, Vehicle Navigation System and Method for Swathing Applications, to McClure et al. filed Mar. 25, 2003. The contents of which are incorporated by reference herein in their entirety. It will be appreciated that this method may be used as the only methodology whether turning to the desired line 110 or away from the desired line 110, however approach 260 provides improved results in "feathering" the approach of the vehicle 5 to meet the desired line 110.

Figure 3:
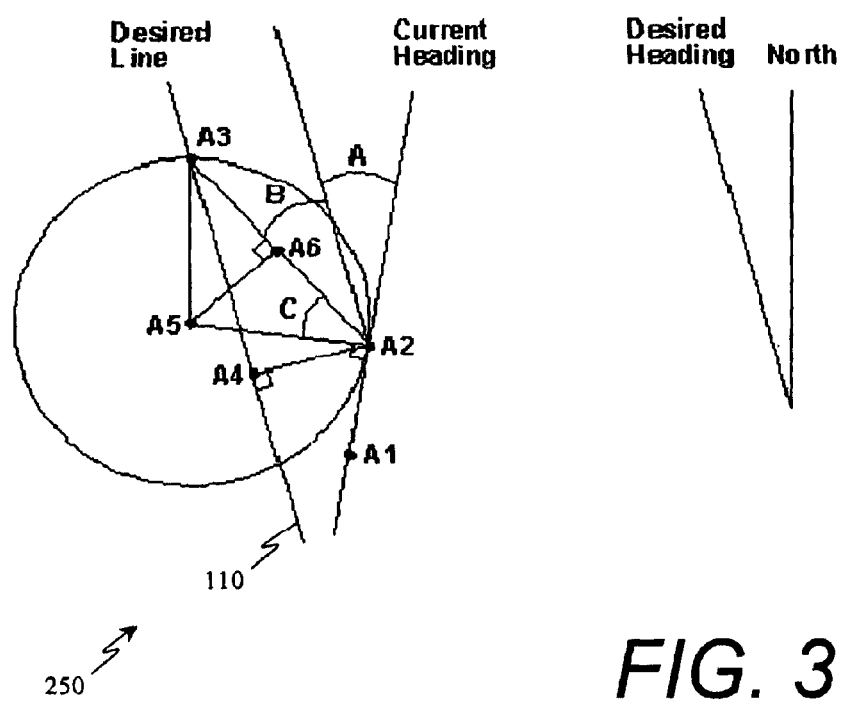
FIG. 3 depicts an illustrative methodology for acquiring the desired line for a straight-line approach.

Referring now to FIG. 3, the first methodology 250 is employed when the vehicle exhibits a heading that aims the vehicle 5 away from the desired line 110 or further up the desired line 110 than the aim point AP. In this methodology 250, the desired radius of curvature and/or desired rate of turn, denoted ROT is computed as follows:

$$R=\text{sqrt}((A2-A4)*(A2-A4)+(A3-A4)*(A3-A4))/ (2*\text{COS}(90-(A\pm B)))\ \text{ROT}=\text{speed}*180/(\text{pi}*R)$$

where:
A1=current GPS position
A2=forward predicted actual position of the implement to account for GPS computation delay and antenna/implement relative positioning
X=A2−A4=off line, current cross track error
A3=forward predict aim point
L=A3−A4=forward predict distance
A=DGPS and DGPS gyro a heading from desired heading
B=aim angle from desired heading
ROT=rate of turn in deg/sec
C=90−(A+B)
R=A2−A5=A3−A5=radius of curvature
cos(C)=sqrt(X*X+L*L)/(2*R).

It will be appreciated that as used herein desired rate of turn and radius of curvature, R, may be used interchangeably as the two pararmeters are related by the equation:

$$\text{ROT}=\text{speed}*180/(\text{pi}*R).$$

Radius of curvature may be employed, as that is the parameter readily available and utilized in an exemplary embodiment. However, it will be appreciated that either term may be utilized without loss of generality.

Figure 4:
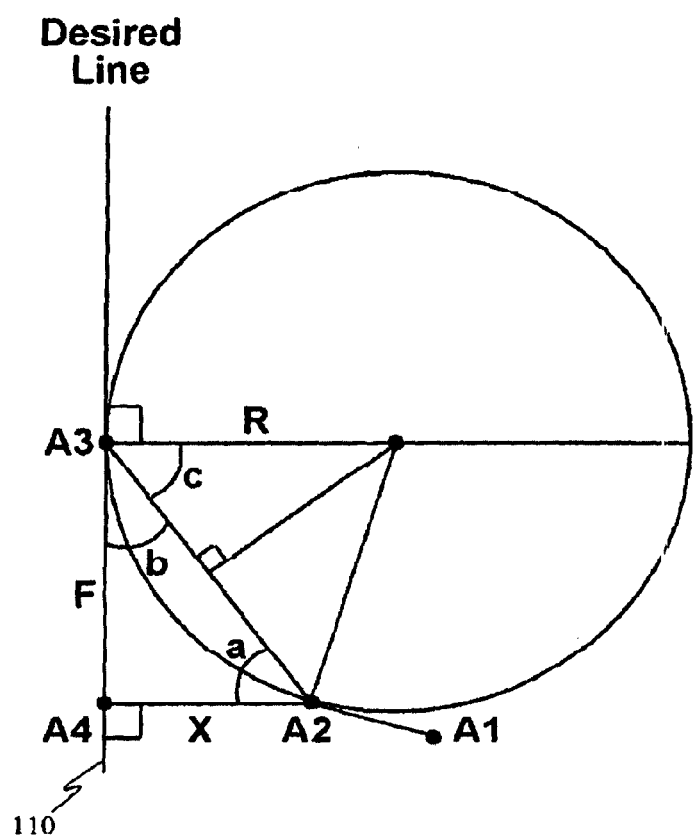
FIG. 4 depicts another illustrative methodology for acquiring the desired line for a straight-line approach.

Referring now to FIG. 4, the second methodology 260 for approaching the desired line 110 with feathering to minimize any overshoot is depicted. As stated above, this second method 260 is employed when the current heading of the vehicle 5 is directed onto line before the aim point AP.

The Figure shows the second method employed to calculate the desired radius of curvature and thereby the desired rate of turn (ROT) for the vehicle 5 to reach the aim point AP on the desired line 110 as follows:

$$\text{sqrt}(X*X+F*F)/(2*\cos(90\tan(X/F))$$

$$R=\text{speed}*180/(\text{pi}*\text{ROT})$$

$$\text{ROT}=\text{speed}*180/(\text{pi}*R)$$

where:
A1=current GPS position
A2=forward predicted actual position of the implement to account for GPS computation delay and antenna/implement relative positioning
A3=aim point on the line
X=current cross track error from the line forward predict value down the line, based on a long track speed and a forward predict time plus a minimum turn radius
R=radius of curvature
ROT=gyro rate of turn, deg/sec $$B=\tan(X/F)$$

$$C=90-B$$

$$\cos(C)=\text{sqrt}(X*XF*F)/(2*R)$$

$$R=\text{sqrt}(X*X+F*F)/(2*\cos(90\tan(X/F))\ \text{speed}*180/ (\text{pi}*\text{ROT})$$

$$\text{ROT}=\text{speed}*180/(\text{pi}*R)$$

In an implementation of an exemplary embodiment, the desired radius of curvature, R, is generated in the guidance unit 20. This is converted to rate of turn (ROT) in the steering control unit 30 to compare with the actual rate of turn measured by the self calibrating internal rate gyro 40.

Contour Line Steering Using Turn Rate

Figure 5:
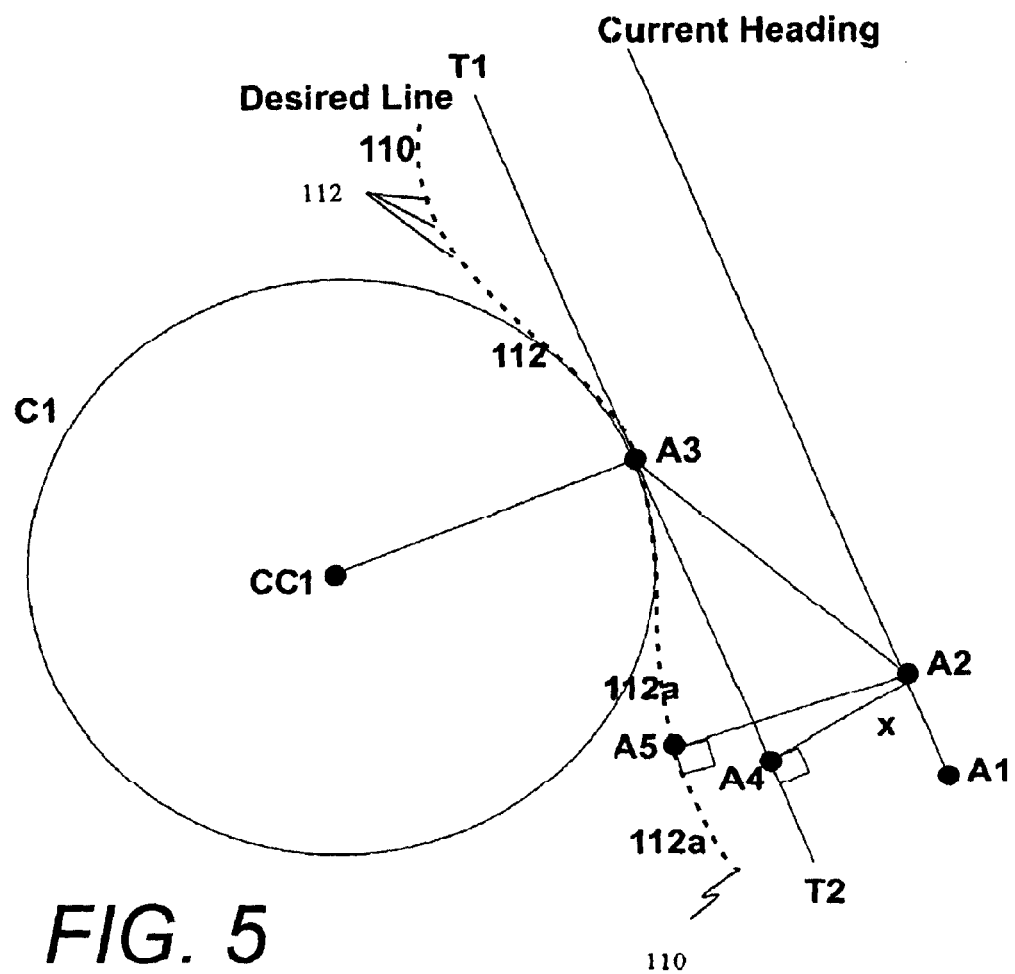
FIG. 5 depicts an illustrative methodology for acquiring the desired line for a contour.

Turning now to FIG. 5, there is depicted an illustration showing the methodology employed to define the aim point AP on a contour track. The desired line 110, in this instance, includes a series of points 112 at selected intervals. The series of points 112 may be logged or generated from data gathered on previous guidance passes or loaded into the guidance system 10 that defines the desired track to follow. In the figure, the points 112a depicted "below" point A3 are calculated as the closest point on a best-fit curve to that series of points close to the actual forward predicted current position, denoted A2. Point A3 is generated from point A5 as the aim point AP further down the desired line 110. This position is based on the current speed and a user set time plus a small fixed dist ce, which reflects the minimum turn radius capable by the vehicle.

A best-fit first order curve is selected based on several points 112 on either side of point A3, to generate an estimate of a circle, denoted c1, with a center at cc1. A tangent line to circle c1, denoted T1-T2, through point A3 is used to generate a point A4, on a line perpendicular to tangent line T1-T2, to the actual current position A2.

Figure 6:
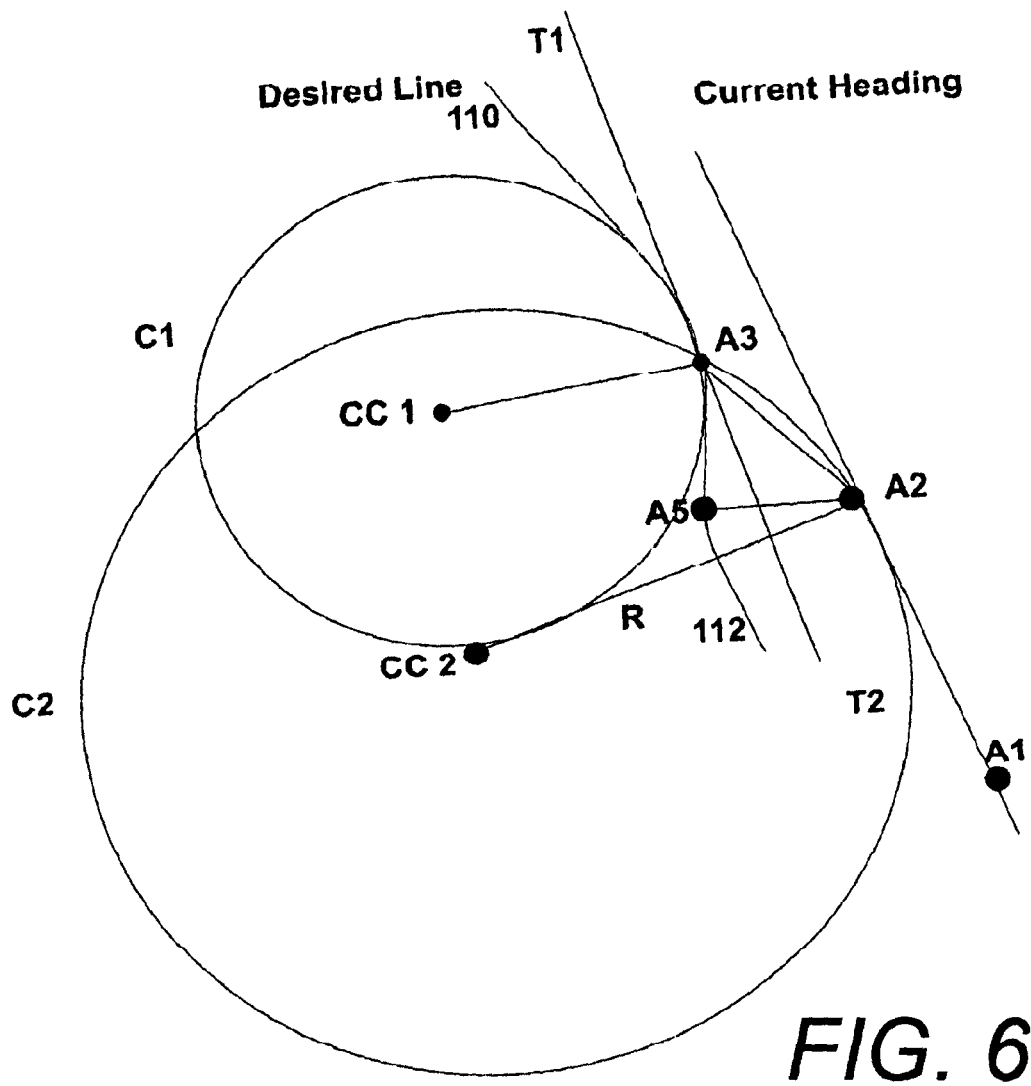
FIG. 6 depicts an illustrative methodology for acquiring the desired line for a contour when current vehicle heading is directed away from the desired line.
Figure 7:
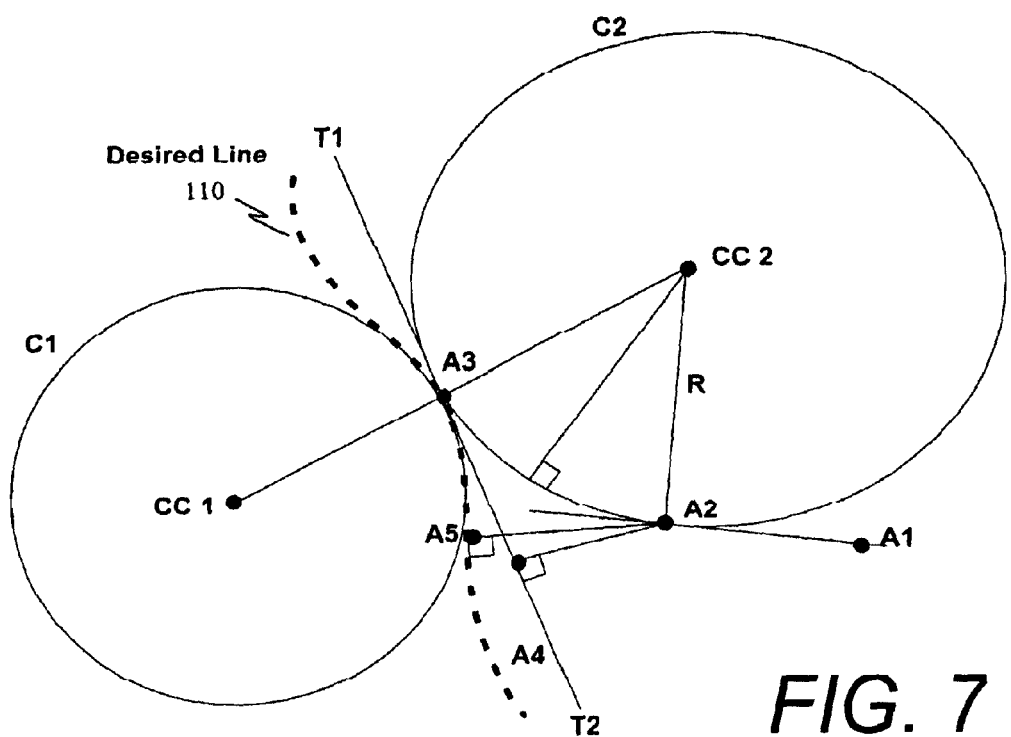
FIG. 7 depicts an illustrative methodology for acquiring the desired line for a contour when current vehicle heading is directed toward the desired line.

Turning now to FIGS. 6 and 7 as well, in c similar manner to the straight-line methods described earlier. If the current heading is on the desired line 110 beyond aim point AP, A3, or is aiming away from the line, then a technique similar to methodology 250 for straight mode is used. FIG. 6 depicts an illustrative methodology for acquiring the desired line 110 for a contour when current vehicle heading is directed away from the desired line 110 as in method 250 for straight mode guidance mentioned earlier. Likewise FIG. 7 depicts an illustrative methodology for acquiring the desired line 110 for a contour when current vehicle heading is directed toward the desired line 110 as in option 4 for straight mode mentioned earlier.

It will be appreciated that the magnitudes of distance of segments A2-A4 and A4-A3 may readily be ascertained from the points cc1, A3 and A2. For example, it will be appreciated that with a simple coordinate transformation of about point A3, the values for the segments are readily identifiable lengths on the axes. Another coordinate transformation may be accomplished by rotating points A2 and A4 about the point cc1 to bring point A3 perpendicular (vertical) thereto and making the lengths easily determinable.

A1=current GPS position
A2=forward predicted actual implement position to account for GPS computation delay and antenna/implement relative positioning
A5=closest point to best fit of desired line
A3=forward predict value down the line, primarily based on the current speed and a forward predict time
c1=best fit circle around number of points before and after position at F
cc1=center of circle c1
T1, T2=tangent to circle c1 at A3
A4=perpendicular point to tangent through A2
X=distance AC, cross track to tangent line L=long track along tangent line from A4 to A3
C2=circle, tangential to T1-T2 passing through A3 and A2.
R=radius of curvature of circle c2
cc2=center of circle c2

It will be appreciated that these computations provide a guidance system 10 with sufficient forward knowledge (e.g., always looking forward to a point A3) of the contour track ahead to provide turning for contour steering guidance. Advantageously, the guidance system may readily be controlled to direct that vehicle 5 to capture the desired line 110 and maintain the contour track.

Points A2, A3 and A4 are used to generate a circle c2 and the radius R, points cc2 to A3, as in the other methods.

This desired radius of curvature, R, is generated in the guidance system 20. Once again, this desired radius is converted to desired rate of turn, using the current speed, in the steering control unit 30 to compare with the actual rate of turn of the vehicle 5.

Previous methods log a series of edge points to determine the area already covered. Algorithms are used to rapidly resample this data set to find a sub-set of points closest to the current position for faster real time searching. Advantageously, the current method disclosed herein improves on the state of the art to provide a better fit of a curve to the series of points closest to the current aim point AP, A3. Such an approach smoothes out the real time generated aim points. Coupled with the exemplary embodiments herein, using radius of curvature corrections results in sufficiently smooth operational response to facilitate utilization of a simple graphical steering guide display for contour steering as well as straight-line steering.

Straight, Parallel, Mode Offsets To Compensate For DGPS Drift And Existing Rows

Returning to FIGS. 2, 3, and 4, it will be appreciated that straight-line guidance as described above may be initiated almost immediately by generating close A and B points. A and B points have normally been generated at the extremities of the desired line 110. In an exemplary embodiment, the aim point AP or B may be updated as often as desired, whether on the fly, or as the operator drives down the first line. In an exemplary embodiment, an operator selection control is provided for operator input while on the desired track.

Methods have been developed to account for position drift in DGPS systems. This allows the use of lower end DGPS systems to be used in general steering guidance and to follow previous tracks or field rows. A method to shift over the relative AB guidance line accounts for DGPS drift or irregular spacing between already laid crop rows. In yet another exemplary embodiment, a method provided to proportionally shift the aim end of the AB guidance line allows the system to be easily aligned to match existing crop rows laid out at different spacing and in slightly non parallel directions. All of these offsets can be easily implemented in real time to allow fine adjustment at any time down the line. These offsets can be retained for the remainder of the cob or returned to the previous values. This allows this guidance system 20 to be used in areas of the world where differential service or high accuracy DGPS systems are too expensive or not readily available.

These techniques are useful when the operator is driving in fields with previous furrows, rows or tracks not necessarily generated with a high accuracy positioning system. It also allows lower accuracy differential systems to be corrected for positional drift. The result is vehicle 5, e.g., tractor and towed implement, positioning in the desired place. Similarly, previous methods log the current swath center track and then generate a new track to follow for the next pass, based on the swath offset. Another technique logs a series of edge points to determine the area already covered. In yet another exemplary embodiment, the guidance system 20 improves on the existing art by providing algorithms to rapidly resample a data set to find a sub-set of points close to the current position for faster real time searching and providing a best fit a circle to a series of points closest to the current aim point. Advantageously, this approach reduces noise on real time generated aim points and facilitates calculation of the desired curved path to follow to optimize reaching this aim point. The data ray then be used by a rate gyro based control system for auto steering in a contour mode.

It will be appreciated that various levels of accuracy and drift can be obtained by using different DGPS systems. E-Dif, Wide Area Augmentation System (WAAS), single frequency Real-Time Kinematic (RTK), and dual frequency RTK are all available at increasing cost. All of these systems are supported by the guidance and steering methods disclosed herein. For example, the line-offset features mentioned above are particularly useful for lower accuracy GPS positioning systems to allow them to be utilized for steering functions. In particular, the WAAS augmented carrier phase techniques of U.S. Pat. No. 6,397,147, the disclosures of which are incorporated by reference herein in their entirety, are readily applicable to the measurement techniques utilized herein.

Slope Compensation

Turning to another issue that affects guidance and steering accuracy, slope compensation is sometimes desirable to position the implement. For example, in the case of a tractor and a towed implement, maintaining the towed implement in the correct position during guidance on sloped terrain. It will be appreciated that the offset resultant from sloped terrain is not a significant problem on a continuous uniform slope, when passes in opposite directions give the same amount and direction of offset. In rolling hills, however, non-compensated slope can result in snaking furrows for a closely coupled plowing operation. Subsequent cultivating operations may have problems in following these motions, especially without DOPS guidance or guidance without any offset capability. A calibrated horizontal accelerometer and longitudinally mounted roll rate gyro 50 operably connected to the steering control unit 30 enables and facilitates compensation. In yet another exemplary embodiment, the acceleration is employed to generate a slope bias. Once again, as with the rate gyro 30, the signals from the accelerometer and roll rate gyro 50 may be filtered to provide the desired dynamic characteristics. Advantageously, this can be carried out without the expense and computational overhead of methods, relying on the use of expensive RTK receivers for X, Y, Z track positioning or multi-antennae systems. In an exemplary embodiment, the slope angle from the accelerometer, roll rate gyro, 50, is transmitted to the guidance system 20 as a cross track compensation error, in this instance to the steering control unit. The acceleration signal is utilized as a calibration for a zero level and to apply a cross track slope compensation to the guidance algorithms based on a user entered antenna height/position on the vehicle 5.

Area Compensation for Sloping Terrain

Operating on hilly terrain give rise to another issue for accurate swathing. The ground area is larger than the two dimensional (flat) area of the field. This means that guidance must compensate to address the slope contour and ensure spacing between lines remains constant. This is critical to ensure cultivating and harvesting machinery can operate efficiently. Planting, cultivating and harvesting machinery can often have different numbers of row implements and this can result in crop damage if spacing between swath passes are not as expected. Current methods use high precision altitude measurements on passes to estimate the slope from the current position or tilt sensors to do this. In an exemplary embodiment a mapping technique is employed to compensate for sloping terrain to ensure accurate swath spacing.

A two dimensional surface can be represented by a rubber sheet polynomial using co-ordinates X and Y. A typical representation for third order is:

$$X=A*X+B*X*X+C*X*X*X+D*Y+E*Y*Y+F*Y*Y*Y*GX*Y*Y+H*X*X*Y+I*X*Y+T$$

and $$Y=K*Y+L*Y*Y+M*Y*Y*Y+N*X+0*X*X+P*X*X*X*QY*X*X+R*Y*Y*X+S*Y*X+T$$

A model of the X and Y slope gradients of a field is generated in a similar manner and saved to a database. This allows, in real time, based on the X and Y locations the X and Y gradients to be read from a gradient database and correction to swath width for real time guidance applied. This will give the correct spacings between all rows, including the space between the outside rows on opposite passes. For example, on a field with a hill in the center the passes will appear to cause an increasing bulge in the center and allow extra fill in lines to be generated in the field. This methodology will actually increase crop production by utilizing the actual field area, not just its two-dimensional area.

Figure 9:
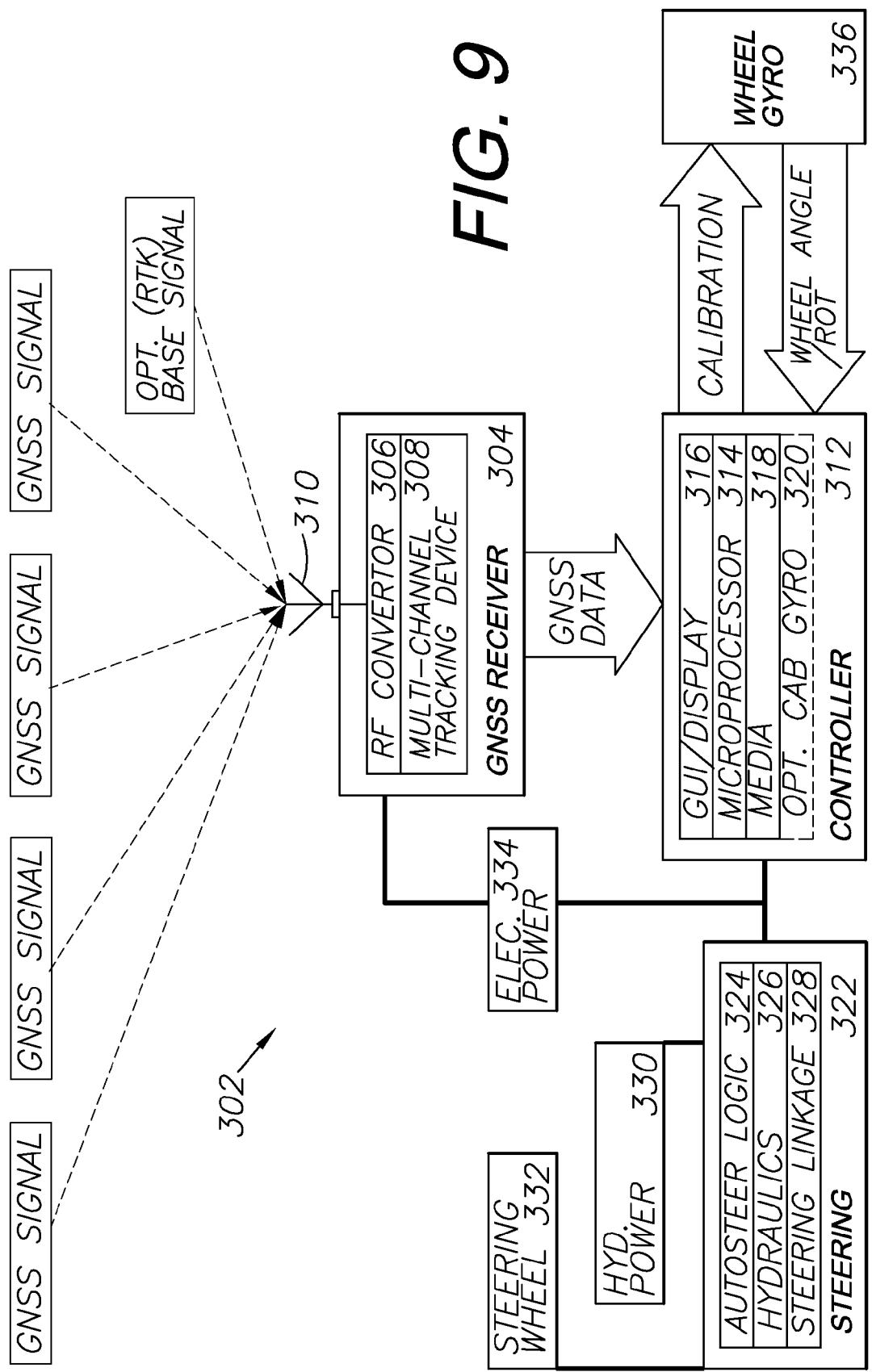
FIG. 9 is a block diagram of a Global Navigation Satellite System (GNSS) vehicle guidance control system with a wheel gyro comprising another modified embodiment of the present invention.

FIG. 9 is a block diagram showing a GNSS control system 302 comprising another alternative embodiment of the present invention and including a GNSS receiver(s) 304 with an RF converter 306 and a multi-channel tracking device 308. One or more antennas 310 are connected to the receiver 304. The receiver 304 outputs GNSS data, such as ranging information, to a controller 312 including a microprocessor 314, which is programmed to compute positioning and navigational solutions and output appropriate steering commands and to display information on a suitable graphical user interface (GUI) 316. The controller 312 includes a media device 318 for storing data and an optional cab gyroscope (gyro) 320, which can be connected to a part of a vehicle body, such as a cab in which the controller 312 can be mounted. Alternatively, the vehicle can have an articulated configuration with pivotally interconnected front and back sections. Such vehicles are steered by pivoting their articulated sections with respect to each other.

The controller 312 is connected to a steering subsystem 322, including autosteering logic 324, hydraulics 326 and steering linkage 328. The system steering subsystem 322 is connected to a hydraulic power source 330 and also receives steering inputs from a steering wheel 332. An electrical power source 334 is connected to the system 302 components.

A wheel gyroscope (gyro) 336 is preferably connected to the steerable wheels (or to one of the sections of an articulated vehicle) and can be mounted on a wheel hub or the steering linkage for instantly responding to vehicle steering conditions represented by deflection of the steerable wheels. The wheel gyro 336 output comprises the wheel angle and the vehicle rate of turn (ROT), the latter of which is a function of the wheel angle and the vehicle speed. The controller 312 provides output to the wheel gyro 336 comprising calibration signals derived from GNSS positioning and/or orientation (attitude) information. The controller 312 can be programmed with a filter or rate limiter for the yaw and ROT information from the wheel gyro 336 to avoid unstable overreaction to such inputs, which otherwise could cause the vehicle to oscillate.

Figure 10:
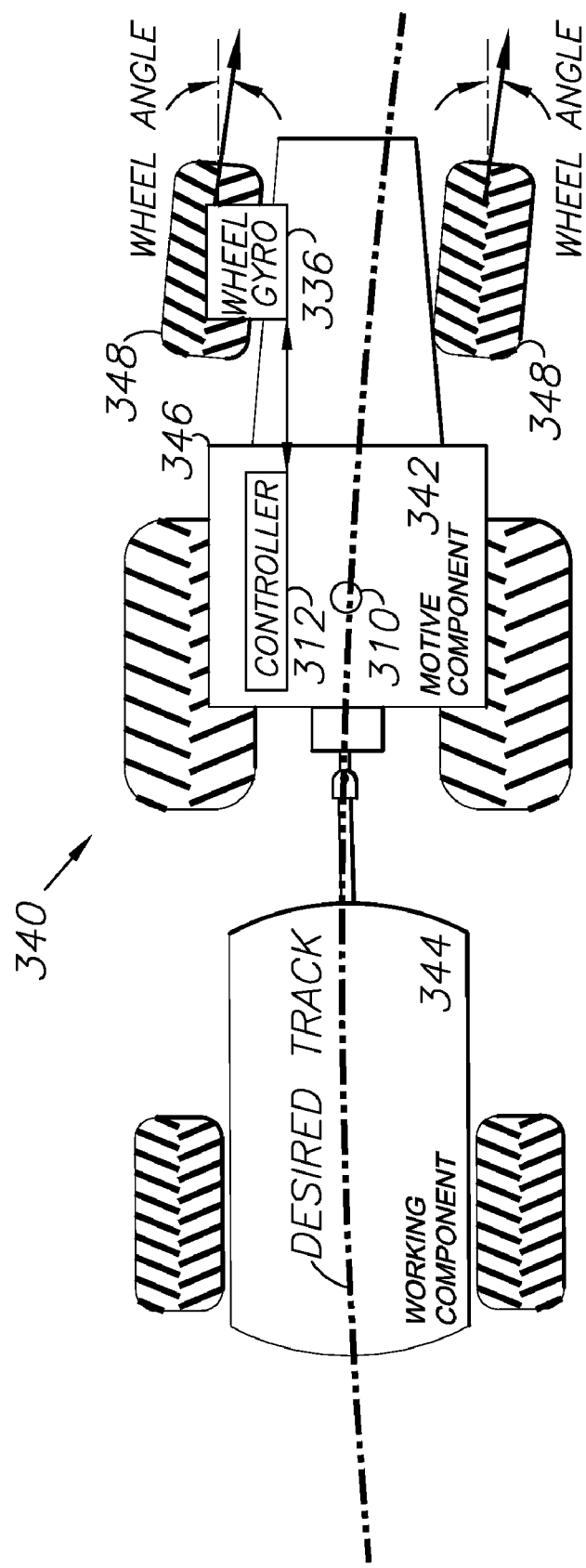
FIG. 10 is a plan view of a vehicle (tractor) and an implement (sprayer) in a contour mode of operation with the modified embodiment GNSS vehicle guidance control system.

FIG. 10 shows an agricultural equipment 340 application of the guidance system 302 comprising a motive component or tractor 342 hitched to a working component or implement 344, e.g., a sprayer. The controller 312 is mounted in a cab 346 of the tractor 342, which mounts an antenna 310 on its roof for maximum satellite visibility. The wheel gyro 336 is physically connected to the steerable wheels 348 and is electrically connected to the controller 312.

The equipment 340 is shown in a contour mode with a curved Desired Track whereby the steerable wheels 348 are deflected by the steering subsystem 322 to form a Wheel Angle with a center line of the tractor 342. The Wheel Angle is detected by the wheel gyro 336 and output to the controller 312, along with the ROT sensed by the wheel gyro 336.

Figure 11:
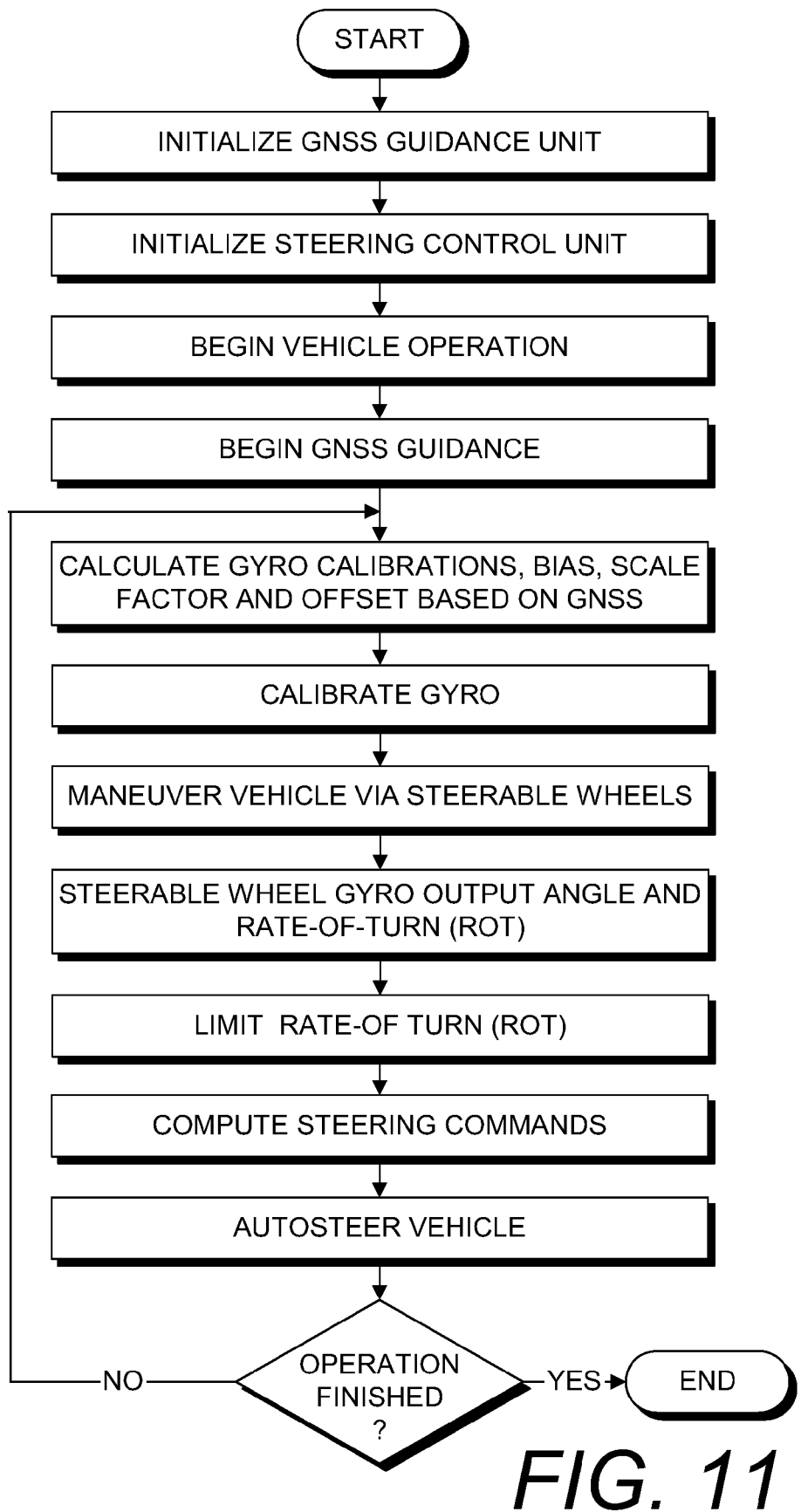
FIG. 11 is a flowchart showing a GNSS vehicle guidance method utilizing the modified embodiment control system.

FIG. 11 is a flowchart of a GNSS guidance method comprising an aspect of the present invention. From a start the GNSS guidance and steering control units or components are initialized, which typically includes acquiring GNSS signals. Vehicle operation begins, with the guidance system 302 automatically steering the vehicle 342 according to a predetermined or field-programmed guidepath, which typically involves a swathing pattern for effectively covering a field. Calibrations, bias, scale factor and offset are calculated for the wheel gyro 336 based on the GNSS output from the controller 312 and the wheel gyro 336 is calibrated accordingly. The vehicle 342 maneuvers via its steerable wheels 348 and the wheel gyro 336 provides output corresponding to wheel angle and ROT, which are input to the controller 312. A feedback control loop is established while the operation continues whereby the wheel gyro 336 is continuously calibrated with GNSS-derived information, an provides information to the controller 312 for maintaining the equipment 340 on a desired track. When the operation is finished, the process ends.

By mounting the wheel gyro 336 on the steerable wheels 348, relatively instantaneous wheel angle and ROT information is transmitted to the controller 312. Various errors, delays and inaccuracies can thus be avoided. For example, the cab gyro 320 reacts to cab 346 movements, which are inherently lagging behind the steerable wheel angle changes. The mass and momentum of large agricultural equipment tends to resist directional changes whereby monitoring the steerable wheels can enhance system responsiveness and forward-predicting capabilities. The controller 312 can utilize ROT signals from both the cab gyro 320 and the wheel gyro 336, which can be sampled and averaged as appropriate for modeling the vehicle 342 dynamics.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claim.

Having thus described the invention, what is claimed as new and desired to be secured by Letters Patent is:

1. A method for steering an agricultural vehicle including the steps of:
   receiving global navigation satellite system (GNSS) data including position and velocity information corresponding to at least one of a position, velocity and course of said vehicle;
   mounting a yaw gyroscope (gyro) on a steerable component of said vehicle;
   calibrating said yaw gyro with said GNSS data;
   receiving from said yaw gyro a yaw rate signal corresponding to a yaw rate of said vehicle;
   computing a compensated heading for said vehicle based on an integration of said yaw rate signal, said compensated heading comprising a blend of said yaw rate signal with heading information based on said GNSS data, wherein said compensated heading is further dynamically calibrated based on said GNSS data; and
   for each desired swath comprising a plurality of desired positions and desired headings:
      computing an actual track and a cross track error from said desired swath based on said compensated heading and said position, wherein said position is compared with a selected desired position of said plurality of desired positions and said compensated heading is compared with a selected desired heading of said plurality of desired headings;
      calculating a desired radius of curvature to arrive at said desired swath with a desired heading; and
      generating a steering command based on said desired radius of curvature to a steering mechanism, said steering mechanism configured to direct said vehicle.

2. The method of claim 1, which includes the additional step of connecting said yaw gyro to a steerable wheel of said vehicle.

3. The method of claim 2, which includes the additional step of connecting said yaw gyro to a hub of said steerable wheel.

4. The method of claim 3, which includes the additional step of connecting said yaw gyro to a steering mechanism.

5. The method of claim 1 wherein said vehicle is articulated with front and back pivotally-interconnected vehicle sections and said yaw gyro is mounted on one of said sections.

6. The method of claim 1 which includes the additional steps of:
   generating a steerable wheel angle signal with said gyro;
   generating a ROT signal with said gyro;
   providing said vehicle with a controller; and
   receiving as inputs to said controller said wheel angle and ROT signals from said gyro.

7. The method of claim 6, which includes the additional step of filtering said gyro output.

8. The method of claim 1 wherein said desired radius of curvature calculating step includes generating radius of curvature data based on best fit algorithms from said GNSS data including a current position, a heading and a speed to a desired aim point and a desired heading, said aim point being at least one of: on a straight-line with parallel guidance; an interpolated point from a point of closest approach to a previously logged, stored or generated curved track; a series of points defining an edge of a previously traveled swath; and a data file of track points based on best fit algorithms.

9. The method of claim, 1, which includes the additional steps of:
   receiving differential corrections for said GNSS data; and
   correcting said GNSS data based on said differential corrections.

10. The method of claim 9 wherein said GNSS data includes at least one of carrier phase RTK corrections, satellite-based differential corrections and ground-based differential corrections.

11. The method of claim 1, which includes the additional steps of:
   using a differential GNSS with multiple antennas optimized to provide additional accuracy and said GNSS data further including heading data and generating said compensated heading utilizing said GNSS data and said heading data.

12. The method of claim 1 wherein said dynamic calibration includes at least one of rate gyro bias error and scale factor error during operation and eliminates static initialization.

13. The method of claim 1, which includes the additional steps of:
   generating a tilt angle for said vehicle based on at least one of a filtered accelerometer signal and roll signal which can be used to generate a cross track correction based on antenna rotation height to correct for slope induced error in said crosstrack error.

14. The method of claim 1, which includes the additional steps of:
   reducing error in and along track velocity and position by rotating an east and north velocity from said GNSS data into a long track and cross track components using said compensated heading.

15. The method of claim 1, which includes the additional steps of:
   generating a steering command to drive a hydraulic or electrically driven steering system of said vehicle based on a difference between said desired curvature to reach and aim point, a current speed of said vehicle and a rate of turn of said vehicle.

16. The method of claim 1, which includes the additional steps of:
   offsetting said desired swath to match differences in spacing of existing tracks to compensate for spacing errors therein;
   compensating for features in fields with a step in a nominal spacing of parallel guidance lines by offsetting said desired line to align with a current position; and
   determining in real-time a slope at a current position and application of a swath width adjustment to optimize real ground coverage to yield correct spacing between swaths and additional ground coverage.

17. A system for steering an agricultural vehicle with a steerable component, which system includes:
   a GNSS receiver including an RF converter and a multi-channel tracking device;
   and antenna connected to the RF converter;
   a controller including a microprocessor;
   said controller receiving GNSS data input from said receiver;

a steering subsystem including autosteering logic, an electric or hydraulic power source and steering linkage connected to said power source;

said steering subsystem receiving steering command input from said controller;

a wheel gyroscope (gyro) connected to said vehicle steerable component and providing wheel angle and rate-of-turn (ROT) input to said controller; and said controller providing GNSS data as inputs to calibrate said wheel gyro.

18. The system according to claim 17, which includes:

said receiver receiving GNSS data corresponding to at least one of a position, velocity, and course of said vehicle;

said controller computing a compensated heading for said vehicle based on an integration of said yaw rate signal, said compensated heading comprising a blend of said yaw rate signal with heading information based on said GNSS data, wherein said compensated heading is further dynamically calibrated based on said GNSS data; and for each desired swath comprising a plurality of desired positions and desired headings:

said controller computing an actual track and a cross track error from said desired swath based on said compensated heading and said position, wherein said position is compared with a selected desired position of said plurality of desired positions and said compensated heading is compared with a selected desired heading of said plurality of desired headings;

said controller calculating a desired radius of curvature to arrive at said desired track swath with a desired heading;

said controller generating radius of curvature data based on best fit algorithms from said GNSS data including a current position, a heading and a speed to a desired aim point and a desired heading;

said aim point being at least one of: on a straight line with parallel guidance; an interpolated point from a point of closest approach to a previously logged, stored or generated curved track; a series of points defining an edge of a previously traveled swath; and a data file of track points based on best fit algorithms; and said controller generating a steering command based on said desired radius of curvature to a steering mechanism, said steering mechanism configured to direct said vehicle.

* * * * *